NOTE: n = AN ODD INTEGER

MULTIPLE FREQUENCY GENERATION AND FREQUENCY MULTIPLICATION

DAVID M. MAKOW
INVENTOR
BY W. R. Meredith
ATTORNEY

Sept. 17, 1957 D. M. MAKOW 2,806,952

MULTIPLE AND FRACTIONAL FREQUENCY GENERATION

Filed Aug. 6, 1954 3 Sheets-Sheet 2

FRACTIONAL FREQUENCY GENERATION AND FREQUENCY DIVISION

DAVID M. MAKOW
INVENTOR

BY W. R. Meredith
ATTORNEY

DAVID M. MAKOW
INVENTOR.
BY W. R. Meredith
ATTORNEY

United States Patent Office 2,806,952

Patented Sept. 17, 1957

2,806,952

MULTIPLE AND FRACTIONAL FREQUENCY GENERATION

David M. Makow, Ottawa, Ontario, Canada, assignor to National Research Council, Ottawa, Ontario, Canada, a body corporate Application August 6, 1954, Serial No. 448,340

5 Claims. (Cl. 250—36)

This invention relates to apparatus and method for multiple frequency generation, frequency multiplication, fractional frequency generation and frequency division.

Notwithstanding the variety of uses of the present invention, indicated above, the apparatus is similar, and it is convenient to discuss all of these together.

The apparatus and method to be set out herein contemplates acting on an input frequency so as to produce a plurality of higher frequencies which are integral multiples of the input frequency (multiple frequency generation) or so as to produce only one of such higher frequencies (frequency multiplication); it also contemplates acting on an input frequency so as to produce a plurality of lower and higher frequencies which are rationally related to the input frequency (fractional frequency generation) or so as to produce only one of such lower frequencies (frequency division).

For example, by means of this invention, it is possible to produce from an input frequency of $f$ cycles output frequencies such as $(1, 2, 3, 4 \ldots m)f$ or from any one input frequency of $nf$ cycles output frequencies such as $(1, 2, 3, 4 \ldots k)f$ or any one of these frequencies.

In the prior art, frequency multiplication and division has often been accomplished with multivibrators, i. e., relaxation oscillators wherein two tubes are used with resistance coupling so arranged that the output of each tube is applied to the input of the other.

A disadvantage of multivibrators is that an output is produced where no input signal is present, which may not be desirable. Further multivibrations are not stable in presence of power supply vibrations. These disadvantages do not occur with the present invention.

In the prior art, frequency multiplication was also achieved by harmonic generator means wherein the amplitude of the harmonics decrease at higher harmonics and higher multiples are not readily available.

In the prior art frequency division could also be achieved by means of regenerative modulation circuits. The present invention, however, also utilizes regenerative modulation techniques, and there are a number of additional advantages, apparent from the present disclosure.

A principal object of the present invention is to produce one or more multiple frequencies, or one or more fractional frequencies with certain advantages which are inherent in the apparatus so used that such apparatus is suitable for precision standards of frequency and time, synchronization systems in radio, television, multiplex carrier telephony, electrical musical instruments and in other uses where two or more frequencies or time periods must be maintained in constant relationship to each other.

Numerous additional objects and advantages will be apparent from the present specification and the accompanying drawings.

Figure 1:
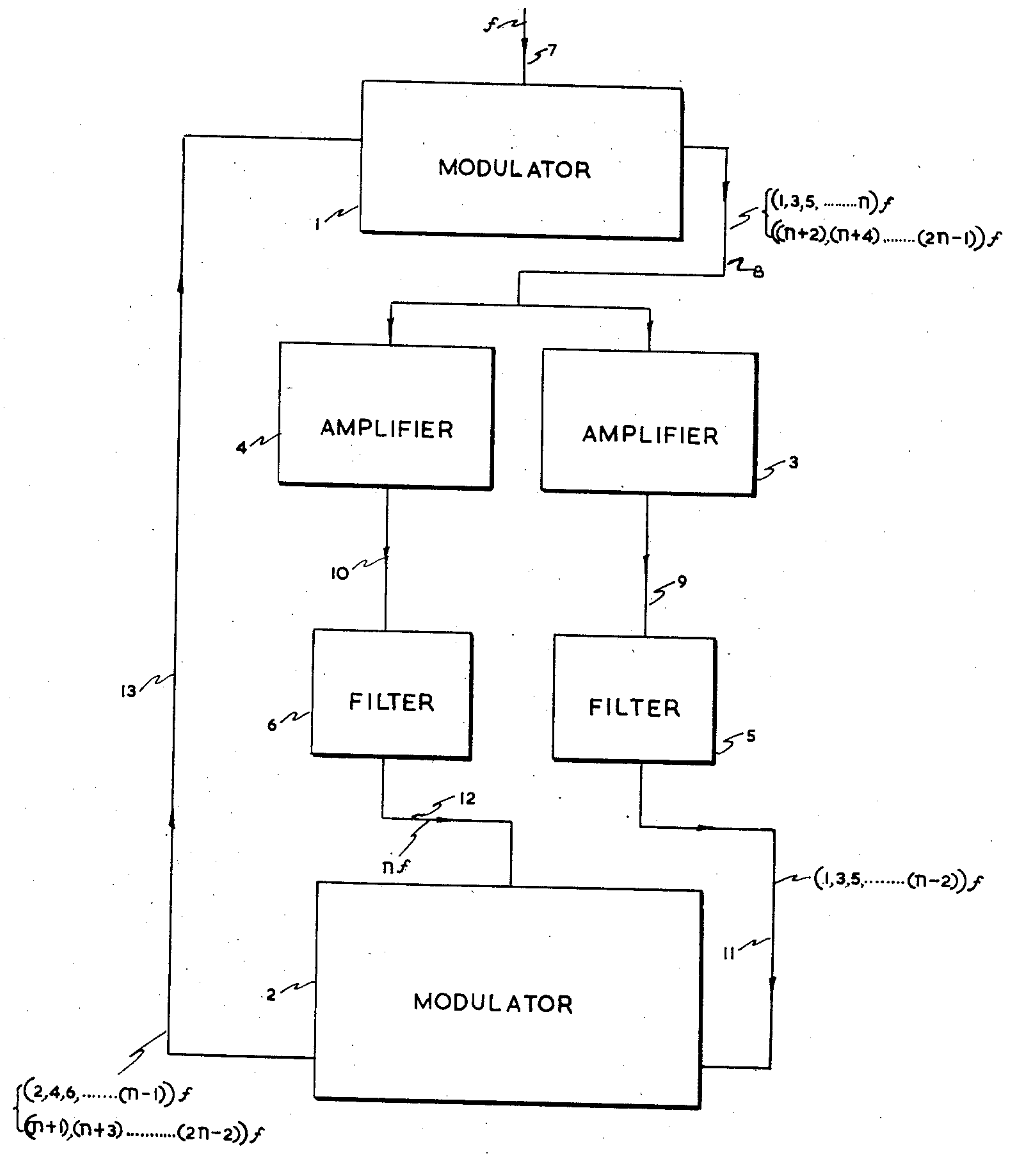
Figure 2:
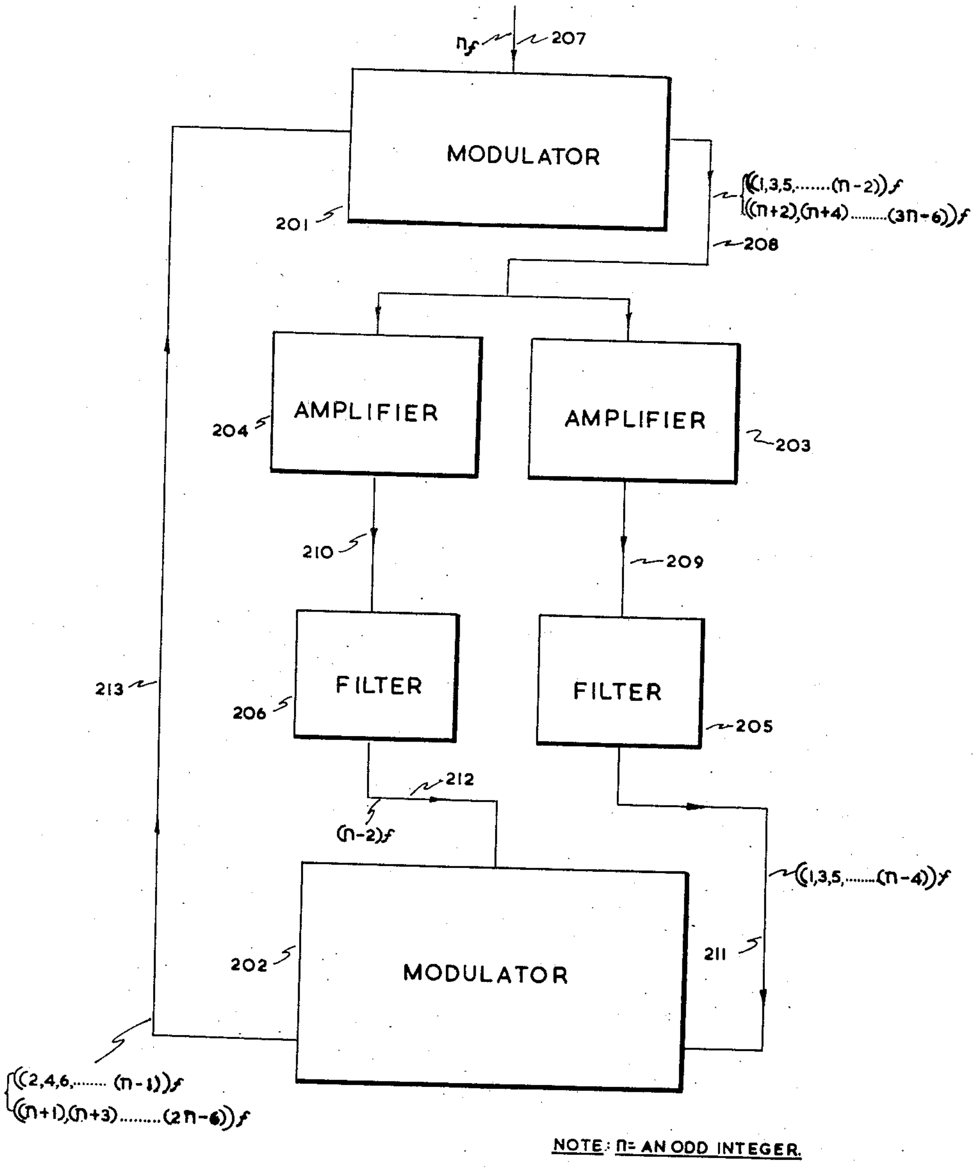
Figure 3:
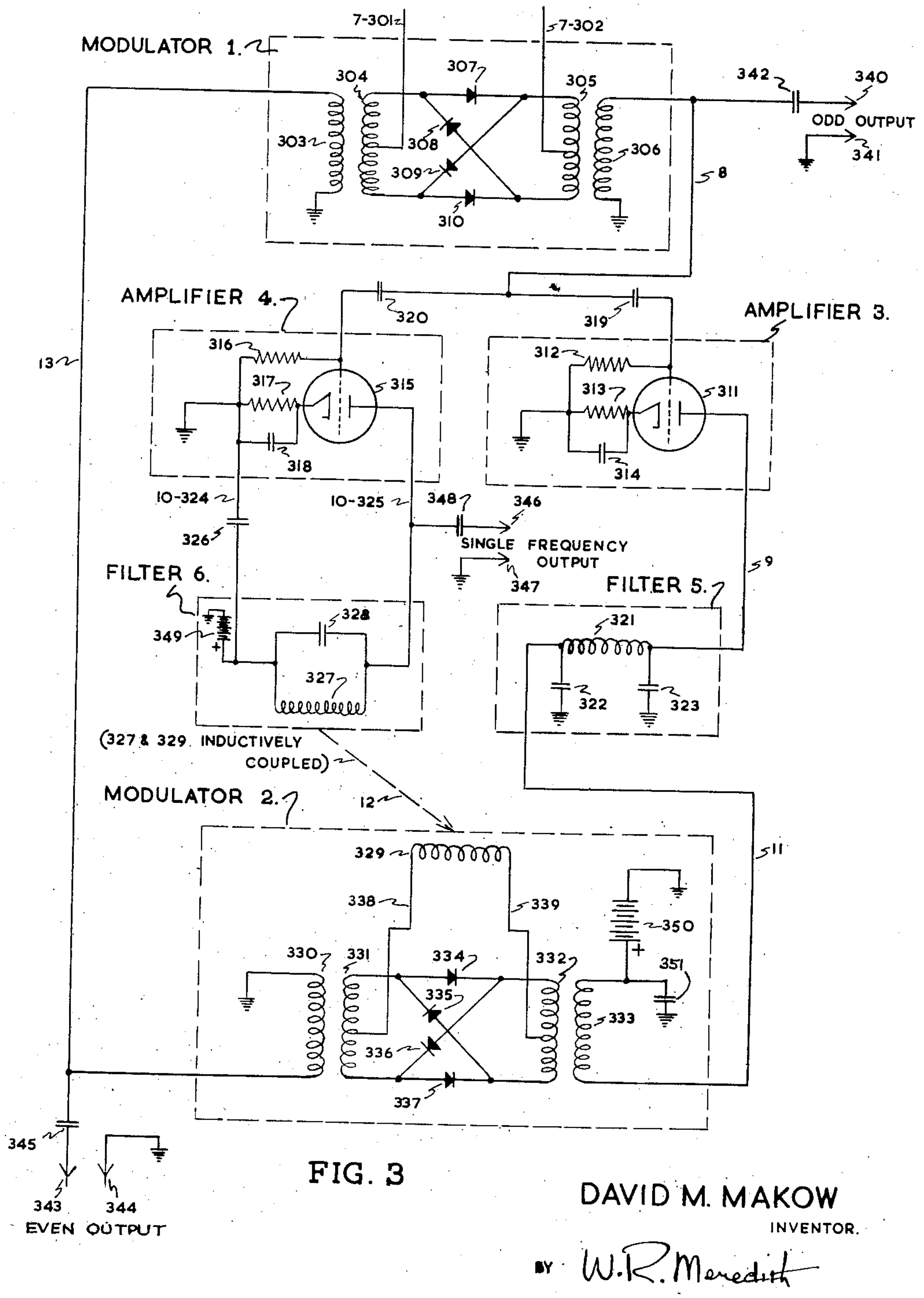

The invention will now be described with the assistance of the accompanying drawings, wherein Figure 1 shows in block diagram form a preferred embodiment of the invention intended for multiple frequency generation and frequency multiplication;

Figure 2 shows an embodiment similar to that of Figure 1 except that it is intended for fractional frequency generation and frequency division; and Figure 3 shows a circuit diagram illustrating the device shown in either Figures 1 or 2 in greater detail.

In the drawings, wherein like parts in all figures are denoted by identical reference numerals, and referring first to Figure 1, it will be seen that the principal parts of this embodiment are two modulators denoted by 1 and 2, two amplifiers denoted by 3 and 4 and two filters denoted by 5 and 6.

Modulator 1 has an input line denoted by 7 and is connected to amplifiers 3 and 4 by a branched line denoted by 8. Amplifier 3 is connected to filter 5 by a line denoted by 9 and amplifier 4 is connected to filter 6 by a line denoted by 10.

Filter 5 is connected to modulator 2 by a line denoted by 11 and filter 6 is connected to modulator 2 by a line denoted by 12, and the different points of entry of lines 11 and 12 at modulator 2 indicate that the two inputs to modulator 2 are applied at different places in modulator 2, as will be set out below.

Modulator 2 is connected to modulator 1 by a line denoted by 13.

The elements of Figure 2 are similar to those of Figure 1, and are denoted by similar reference numerals added to the number "200."

The operation of the circuit of Figure 1, a generator of multiple frequencies and frequency multiplier will now be discussed.

It will be assumed that a frequency of $f$ cycles per second is applied to the input 7 of modulator 1, which may be considered as the "carrier" input of modulator 1.

The filter 6 is tuned to the frequency $nf$, $n$ being an odd integer. Filter 5 is of a low-pass type and has its cutoff frequency at $nf$.

If the gain of the amplifiers 3 and 4 is such that amplifier 4 delivers sufficient switching voltage to the input of modulator 2 (which may be considered the "carrier input" of modulator 2) and the gain of amplifier 3 balances the total losses in the loop, oscillation will build up and its wave form will contain a variety of frequencies to be referred to below.

The manner in which these frequencies are produced and the circuit locations where they occur will now be set out and an example will be given for $n=15$. It will be assumed that the multiples 2, 4, 6, 8, 10, 12 and 14 of the input frequency are present on line 13 at the input of modulator 1, which may be considered the "signal input" of modulator 1. The output of modulator 1 on line 8, because of the frequency addition and subtraction properties of modulator 1, will contain the multiples 1, 3, 5, 7, 9, 11, 13 and 15. The multiple 15 will be amplified and selected by amplifier 4 and filter 6, respectively, and will be applied to the carrier input of modulator 2 on line 12. The multiples 1, 3, 5, 7, 9, 11, and 13 will be amplified and selected by amplifier 3 and filter 5, respectively, and will be applied to the input 11 of modulator 2. The differences of the multiples 1, 3, 5, 7, 9, 11, 13 and the multiple 15 are generated by modulator 2 and produce the originally assumed multiples 2, 4, 6, 8, 10, 12 and 14 on line 13.

The multiples 16, 18, 20, 22, 24, 26 and 28 are produced in line 13, and the multiples 17, 19, 21, 23, 25, 27 and 29 243 in turn produced in line 8. These multiples are however, not essential to maintain the operation of the circuit; they are present as sum components of modulators 1 and 2 at the output lines 8 and 13, respectively. The highest multiple generated is thus $(2n-1)$.

It has been found that the amplitude distribution of the multiples have two peaks. They increase in amplitude up to the multiples $$\left(\frac{n\pm1}{2}\right)$$

and then decrease to reach a minimum at the multiple $n$. The second amplitude peak occurs at the multiples $$\left(n+\frac{n\pm1}{2}\right)$$

This amplitude distribution is of particular interest in cases where maximum output at certain high multiples is required.

The filter 6 should be selective enough to reject the adjacent multiples and the Q of filter 6 should be approximately $$\frac{3}{2}n$$

The steepness of the filter 5 at the cut-off frequency should be such that the filter would introduce little attenuation for the multiple $(n-2)$ and cut-off at the multiple $n$.

It will thus be apparent that by virtue of the action of the components mentioned, a large number of or any one of a large number of multiples of an input frequency $f$ are produced and the circuit will sustain the production of such frequencies in rigid frequency relationship to the input frequency.

The results of the operation of the device shown in Figure 1 will be summarized in the table set out below.

TABLE 1

*Figure 1.—Multiple frequency generation and frequency multiplication when an input frequency of f is applied to line 7, and n is an odd integer*

| Branch of circuit | Frequency produced | |
|---|---|---|
| | Necessary to sustain operation | Incidental |
| Line 7 | $f$ | |
| Line 8 | $(1, 3, 5 \ldots n)f$ | $((n+2, n+4 \ldots (2n-1))f$. |
| Line 11 | $(1, 3, 5 \ldots (n-2))f$ | |
| Line 12 | $nf$ | |
| Line 13 | $(2, 4, 6 \ldots (n-1))f$ | $((n+1), (n+3) \ldots (2n-2))f$. |

The invention will now be described as applied to fractional frequency generation and frequency division, with reference to Figure 2. The arrangement of components in Figure 2 is the same as shown in Figure 1, but the frequencies present are different, as will be set out below.

It is contemplated that a frequency $nf$ where $n$ is an odd integer will be applied to the carrier input modulator 201 on line 207, and will be mixed with frequencies $(2, 4, 6 \ldots (n-1))f$ on line 213 applied to the signal input of modulator 201 (the source of which frequencies will be apparent below) to produce frequencies $(1, 3, 5 \ldots (n-2))f$ on line 208. Amplifier 203 will be of a wide-band type and will provide sufficient gain for balancing the total losses in the system. Filter 205 will be of the low-pass type so as to pass all of frequencies applied to amplifier 203 referred to above except $(n-2)$. The steepness of the cut-off characteristic of filter 205 is such that it will cut off below the frequency $(n-2)$ and there will be little attenuation for the frequency $(n-4)f$.

Amplifier 204 should provide sufficient gain for switching action in modulator 202. Filter 206 will pass only $(n-2)f$ and the Q of filter 206 should be approximately $$\frac{3}{2}n$$

Frequencies $(1, 3, 5 \ldots (n-4))f$ are mixed in modulator 202 with the frequency $(n-2)f$ to produce frequencies $(2, 4, 6 \ldots (n-1))f$, originally assumed present on line 213.

As with the embodiment of Figure 1, some additional frequencies are produced on lines 208 and 213 and these are available but play no part in sustaining the operation of the circuit.

The results of the operation of the device shown in Figure 2 as applied to fractional frequency generation and frequency division will be summarized in the table set out below.

TABLE 2

*Figure 2.—Fractional frequency generation and frequency division when an input frequency of nf is applied to line 207, and n is an odd integer*

| Branch of circuit | Frequency produced | |
|---|---|---|
| | Necessary to sustain operation | Incidental |
| Line 207 | $nf$ | |
| Line 208 | $(1, 3, 5 \ldots (n-2))f$ | $((n+2), (n+4) \ldots (3n-6))f$. |
| Line 211 | $(1, 3, 5 \ldots (n-4))f$ | |
| Line 212 | $(n-2)f$ | |
| Line 213 | $(2, 4, 6 \ldots (n-1))f$ | $((n+1), (n+3) \ldots (2n-6))f$. |

General remarks on the theory of operation as applied to both embodiments of the invention will now be set out, but for convenience only Figure 1 will be referred to.

Operation of the circuit of Figure 1 can be maintained when the filter 5 or the amplifier 3 or both, are placed in line 13 instead of in lines 8—9—11, as shown.

Where $n$ is an even integer, it will be found in general that the circuit will work. A separation between the even and odd multiple, or fractional frequency components, however, will not be possible.

Self-starting properties of such a circuit depend greatly on the amount of excessive loop gain. If the amplifier gain is so adjusted as to cover barely the losses in the loop, the circuit will not be self-starting. A shocking voltage of any kind has to be applied, the transient of which contains some of the wanted frequency component, and this will cause an oscillation to build up. In general, circuits with sufficient loop gain can be self-starting. A slight unbalance of the modulator 1 improves greatly its self-starting ability. Higher input voltage than that in the steady state may have the same effect. Operation starts at a certain final value of the input voltage and there is no output below this value.

Wide range variations of the power supply and input voltage have no effect on the operation of a properly designed and adjusted circuit in accordance with the present invention.

The operation of the circuit is not influenced by any phase-shift somewhere in the loop.

If the input frequency moves away from its predetermined value, the various frequency components in the circuit will follow the change so as to maintain the same ratio. For larger deviations of the input frequency the operation will cease and no output will be present.

The synchronization range depends on the selectivity of the filters in the circuit. Synchronization ranges which exceed many times the stability of the input frequency can be easily obtained.

Although there are numerous advantages to the present invention, one particular advantage will be apparent, namely the discrete separation of the even and odd multiple or fractional frequencies, as the case may be.

Referring now to Figure 3, a possible form of the actual circuit components are shown, with blocks denoting the equivalent combinations of components shown in Figure 1, and also suggesting the corresponding components of Figure 2.

Modulator 1 is a balanced ring modulator of conventional construction. Amplifiers 3 and 4 are conventional. Filter 5 is a simple low-pass filter and filter 6 is an ordinary resonant-type filter. The output of filter 6 to ring modulator 2 is conveyed by coupling between windings denoted by 327 and 329. Otherwise line connections are made between components.

The components of Figure 3 will now be described in greater detail. The input 7 to modulator 1 consists as circuit elements of two lines denoted by 7–301 and 7–302 respectively, the addition of the numeral 7 indicating the elaboration of input 7. As mentioned above, modulator 1 is a balanced-ring modulator consisting of transformers whose windings are denoted by 303–306. The line 13 connects to one end of the primary winding 303, and the opposite end of winding 303 is grounded. The secondary 304 and the primary 305 are center-tapped at which points connection is made to lines 301 and 302 respectively. Rectifiers denoted by 307–310 are connected between inductances 304 and 305 in a conventional manner. The secondary winding 306 is connected at one end thereof to line 8, and the other end of the secondary winding 306 is grounded.

Amplifier 3 is a conventional amplifier and consists of a tube which may be a triode, denoted by 311 and having associated therewith resistances denoted by 312 and 313, and a capacitor denoted by 314.

Amplifier 4 is similar in construction to amplifier 3, having a tube denoted by 315, resistances denoted by 316 and 317 and a capacitor denoted by 318.

In the detailed embodiment shown in Figure 3, modulator 1 is not connected to amplifiers 3 and 4 by a simple branched line, but two capacitors denoted by 319 and 320 are inserted as shown.

Amplifier 3 is connected to filter 5 by means of line 9. Filter 5 consists of an inductance and two capacitors in series, denoted by 321–323, respectively. Line 9 connects to one end of inductance 321, and the other end of inductance 321 is connected to line 11, which in turn connects to modulator 2, to be described below. The two ends of inductance 321 are connected to the capacitors 322 and 323, the opposite sides of which are grounded.

Filter 6 consists of an inductance and capacitor in parallel, the inductance being denoted by 327 and the capacitor being denoted by 328.

Amplifier 4 is connected to filter 6 by means of a pair of lines denoted by 10–324 and 10–325 (the numeral 10 indicating the fact that line 10 in Figure 1 is actually the two lines 324, 325 in Figure 3), Line 10—324 is connected to the cathode side of tube 315, the line 324 having inserted therein a capacitor denoted by 326. Line 10–324 is connected to one side of the inductance capacitor network 327—328, and on the same side connection is made to a voltage source denoted by 349, which will provide the anode supply for tube 315.

The opposite side of the inductance-capacitor network 327—328 is connected to the anode of tube 315.

As mentioned above, there is inductive coupling between filter 6 and modulator 2, and to achieve this, an inductance denoted by 329 is placed adjacent to inductance 327 so that the two inductances form a transformer. The coupling between inductances 327 and 329 are still denoted by 12 in Figure 3, but a transformer coupling will be preferred for the purpose of best matching.

The construction of modulator 2 is similar to that of modulator 1, being a balanced ring modulator consisting of transformers whose windings are denoted by 330–333 and rectifiers denoted by 334–337.

Inductance 329 is connected to center taps on windings 331 and 332 by means of lines denoted by 338 and 339, respectively.

Line 11 connects to one side of primary winding 333 and the other side of winding 333 is connected to a voltage source denoted by 340, constituting the anode supply for tube 311, which is bypassed to ground by the capacitor denoted by 351.

One side of secondary winding 330 is connected to line 13 and the opposite side of winding 330 is grounded.

It will be apparent that any of the various frequencies obtainable in the system shown in Figure 3 can be readily made available.

The odd multiple outputs can be obtained from line 8, for which purpose terminals denoted by 340 and 341 may be provided, terminal 340 being connected to line 8 through a capacitor denoted by 342, and terminal 341 being connected to ground.

The even output multiples may be similarly obtained from line 13 at terminals denoted by 343 and 344, terminal 343 being connected through a capacitor denoted by 345 to line 13, and terminal 342 being grounded.

The single frequency output may be obtained at filter 6, and a practical manner of obtaining such output is on the line 10–325 connecting the anode of tube 315 to inductance 327, at terminals denoted by 346 and 347, terminal 346 being connected to line 325 through a capacitor denoted by 348, terminal 347 being grounded.

It will be seen that the invention herein described and shown has numerous advantages, either referred to or apparent, and has a wide range of useful applications.

I claim:

1. A system for accepting a signal of a given frequency at the input of the system and for producing from said signal one or more signals having frequencies rationally related to said signal of given frequency comprising, a first modulator having a modulating signal input, a signal input and a signal output; a second modulator having a modulating signal input, a signal input and a signal output; means for amplifying and filtering connected between the signal output of said first modulator and the modulating signal input of said second modulator; a second means for amplifying and filtering connected between the signal output of said first modulator and the signal input of said second modulator and the signal output of said second modulator being connected to the modulating signal input of said first modulator.

2. A device as defined in claim 1 wherein said first filter passes a number of multiple frequencies of said input frequency, and said second filter passes one multiple frequency above said input frequency.

3. A device as defined in claim 1 wherein said first filter passes a number of fractional frequencies of said input frequency, and said second filter passes a single fractional frequency of said input frequency.

4. A system for accepting a signal of a given frequency at the input of the system and for producing from said signal one or more signals having frequencies which are whole multiples of said given frequency comprising, a first modulator having a modulating signal input, a signal input being also the input of the system, and a signal output; a second modulator having a modulating signal input, a signal input and a signal output; means for signal amplification and for passing a number of multiple frequencies of said given frequency connected between the signal output of said first modulator and the modulating signal input of said second modulator; second means for signal amplification and for passing one multiple frequency above said given frequency connected between said signal output of said first modulator and said signal input of said second modulator and the signal output of said second modulator being connected to the modulating signal input of said first modulator.

5. A system for accepting a signal of given frequency at the input of the system and for producing from said signal one or more signals having frequencies which are rational fractions of said given frequency comprising, a first modulator having a modulating signal input, a signal input being also the input of the system, and a signal output; a second modulator having a modulating signal input, a signal input and a signal output; means for signal amplification and for passing a number of fractional frequencies of said given frequency connected between said signal output of said first modulator and the modulating signal input of said second modulator; second means for signal amplification and for passing a signal of a fractional frequency of said given frequency connected between said signal output of said first modulator and said signal input of said second modulator, and the signal output of said second modulator being connected to the modulating signal input of said first modulator.

References Cited in the file of this patent

UNITED STATES PATENTS 1,604,140 Affel ------------------ Oct. 26, 1926